US012329702B2

(12) United States Patent
(10) Patent No.: US 12,329,702 B2
(45) Date of Patent: Jun. 17, 2025

Comstock et al.

(54) EMERGENCY LIFTING APPARATUS

(71) Applicants: Kevin Comstock, Beaverton, OR (US); Brian Unger, Beaverton, OR (US)

(72) Inventors: Kevin Comstock, Beaverton, OR (US); Brian Unger, Beaverton, OR (US)

( * ) Notice: Subject to any disclaimer, the term of this patent is extended or adjusted under 35 U.S.C. 154(b) by 330 days.

(21) Appl. No.: 17/974,367

(22) Filed: Oct. 26, 2022

(65) Prior Publication Data

US 2023/0301855 A1 Sep. 28, 2023

Related U.S. Application Data

(63) Continuation-in-part of application No. 17/701,310, filed on Mar. 22, 2022, now Pat. No. 11,931,305.

(51) Int. Cl.
*A61G 7/10* (2006.01)

(52) U.S. Cl.
CPC .......... *A61G 7/1011* (2013.01); *A61G 7/1046* (2013.01); *A61G 7/1059* (2013.01); *A61G 7/1074* (2013.01)

(58) Field of Classification Search
CPC .. A61G 7/1011; A61G 7/1046; A61G 7/1059; A61G 7/1074
See application file for complete search history.

(56) References Cited

U.S. PATENT DOCUMENTS

| | | | | | |
|---|---|---|---|---|---|
| 5,380,034 | A * | 1/1995 | Wilson | A61G 7/053 | 297/29 |
| 5,892,180 | A * | 4/1999 | Carey | A61G 7/1096 | 177/144 |
| 6,325,399 | B1 * | 12/2001 | DeMoss | A61G 7/1067 | 280/250.1 |
| 2004/0232395 | A1 * | 11/2004 | Brooks | A61G 7/1011 | 254/8 R |
| 2004/0239060 | A1 * | 12/2004 | Faucher | B60B 33/026 | 280/47.11 |
| 2014/0331399 | A1 * | 11/2014 | Steinman | A61G 7/1005 | 4/496 |
| 2022/0304878 | A1 * | 9/2022 | Comstock | A61G 7/1017 | |
| 2022/0323279 | A1 * | 10/2022 | Li | A61G 5/1059 | |
| 2023/0127337 | A1 * | 4/2023 | Tsukamoto | A61G 7/1019 | 5/86.1 |
| 2023/0301855 | A1 * | 9/2023 | Comstock | A61G 7/1046 | |
| 2023/0414426 | A1 * | 12/2023 | Grant | A61G 7/1046 | |
| 2024/0041679 | A1 * | 2/2024 | Cooksey | A61G 7/1046 | |

* cited by examiner

*Primary Examiner* — Erez Gurari
(74) *Attorney, Agent, or Firm* — Mark S Hubert PC

(57) ABSTRACT

A portable, lightweight emergency lifting device for downed persons that is intended for use by paramedics/emergency personnel as well as medical facilities and private owners. The lifting device has a single electric screw extendible ram, with a frictional fail safe lifting system. It has a seat with a ramped front edge in conjunction with an arced support leg configuration that allows the seat to extend to the ground when the device is in its collapsed configuration, to aid in loading the patient. The vertical legs open only to an acute angled position so as to leave the immediate area under the seat open and uncluttered. The frame rolls on a pair of fixed front wheels and a wider pair of rear casters.

10 Claims, 10 Drawing Sheets

EMERGENCY LIFTING APPARATUS

CROSS-REFERENCE TO RELATED APPLICATIONS

THIS APPLICATION IS A CONTINUATION IN PART OF U.S. patent application Ser. No. 17/701,310, FILED Mar. 22, 2022, WHICH IS INCORPORATED BY REFERENCE HEREIN IN ITS ENTIRETY, AND WHICH CLAIMS THE BENEFIT OF U.S. PROVISIONAL PATENT APPLICATION NO. 63/164,880, FILED Mar. 23, 2021, WHICH IS ALSO INCORPORATED BY REFERENCE HEREIN IN ITS ENTIRETY.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to devices for use by emergency services personnel, or and more particularly to mechanized, low clearance lifts for injured people on the ground.

BACKGROUND

Medical conditions, age and accidents commonly cause the afflicted to fall to the ground. Once there, often they cannot rise on their own nor can they be righted by others without proper training for fear of compounding further any injuries they may have sustained. In other instances, because of pre-existing conditions, they must be raised very delicately. Lastly, in other situations because of obesity they can't be raised manually.

When raising a downed person, extreme care must be taken to ensure there is no second collapse, weight is shifted safely and the aiding person does not injure themselves. If not handled properly, a simple lift can have disastrous results for the downed person, the aiding party or possibly both.

There are existing mechanized lifts that are utilized by emergency services but these are bulky, heavy, expensive and need specialized training to operate properly and safely. What is needed is an inexpensive, lightweight, compact personal lift that has built in safety guards, is simple to operate and that has a lift approach height directly on, or as close to the ground as possible.

Henceforth, an emergency human lift apparatus that approaches the downed person as low to the ground as possible and slowly and safely raises them from the ground to a seated position in accordance to patient's height, would fulfill a long felt need in nursing homes, private residences, hospitals and emergency service vehicles. This new invention utilizes and combines known and new technologies in a unique and novel configuration to overcome the aforementioned problems and accomplish this.

BRIEF SUMMARY

In accordance with various embodiments, an emergency personal lifting apparatus that pulls the downed person up and back simultaneously, eliminates pinch points, has fail-safe lifting capabilities, has a single electric screw extendible ram with a frictional locking capability for power failures, and is compact and light enough to be carried by one person, is provided.

In one aspect, an emergency human lifting apparatus having zero or a minimal ground clearance height from which the person can be loaded, is provided.

In yet another aspect, lightweight, a roll-able emergency human lifting apparatus able to vertically raise its chair from ground level to more than 2 feet, having an overall length approaching three feet and a weight under 40 pounds, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
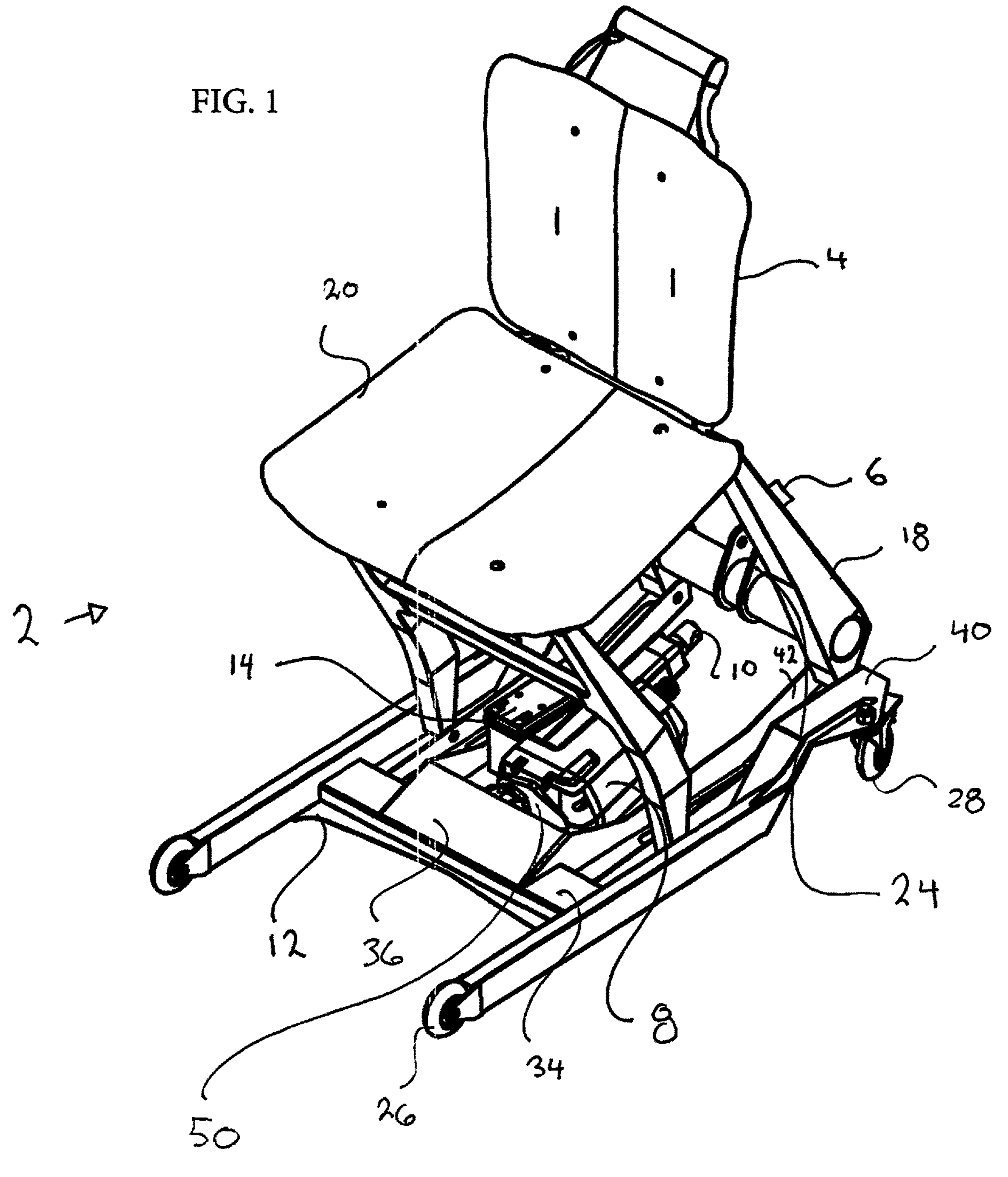
FIG. 1 is a top perspective view of the emergency lift apparatus in its raised configuration.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. The described example is provided for illustrative purposes and is not intended to limit the scope of the invention.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items.

As used herein, the terms "inboard" and "outboard" refer to the location of various components with respect to the center of the frame. Inboard refers to elements positioned between the two frame arms while outboard refers to elements positioned on the outer sides of the frame arms.

The present invention relates to a novel design for a lightweight, compact, collapsible, battery powered, emergency lifting apparatus ("lift") with a frictional fail-safe lifting mechanism for raising downed humans off of the ground, having a polymer vertical lift chair capable of extending to the ground by virtue of its physical configuration of a trapezoidal leg footprint, strategic leg placement within the rolling frame, and the arced front legs. For descriptive references herein, the front or proximal end and direction is at the end of the lift that the chair faces, and the rear or distal end and direction is the end of the lift from which the of the linear actuator's ram extends.

Figure 2:
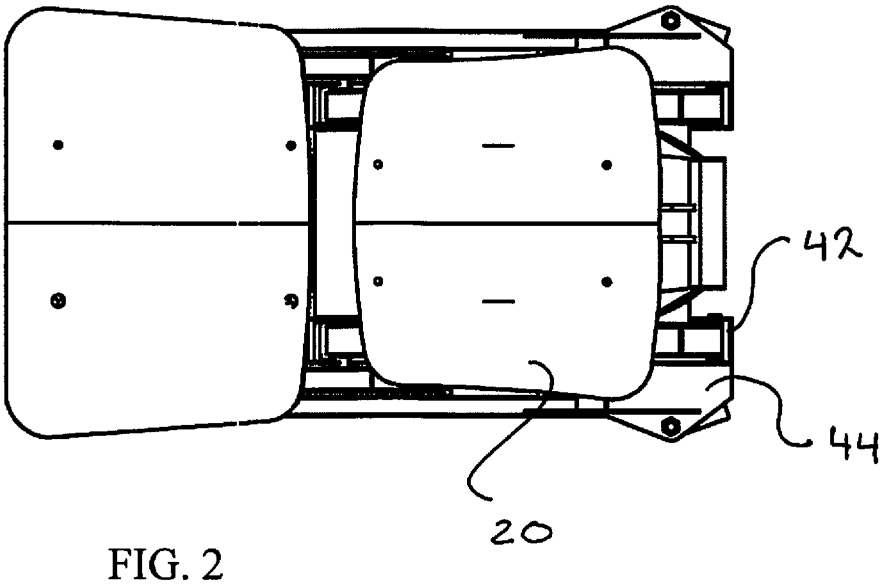
FIG. 2 is a top view of the emergency lift apparatus in its raised configuration.
Figure 3:
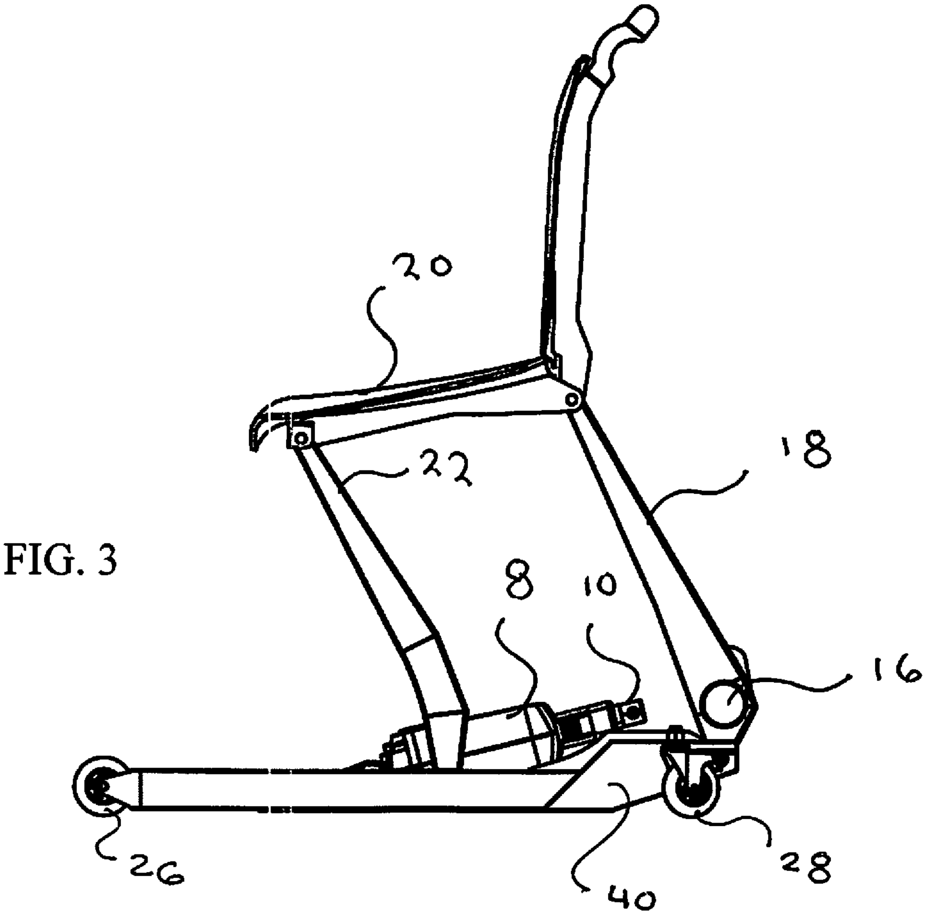
FIG. 3 is a side view of the emergency lift apparatus in its raised configuration.
Figure 4:
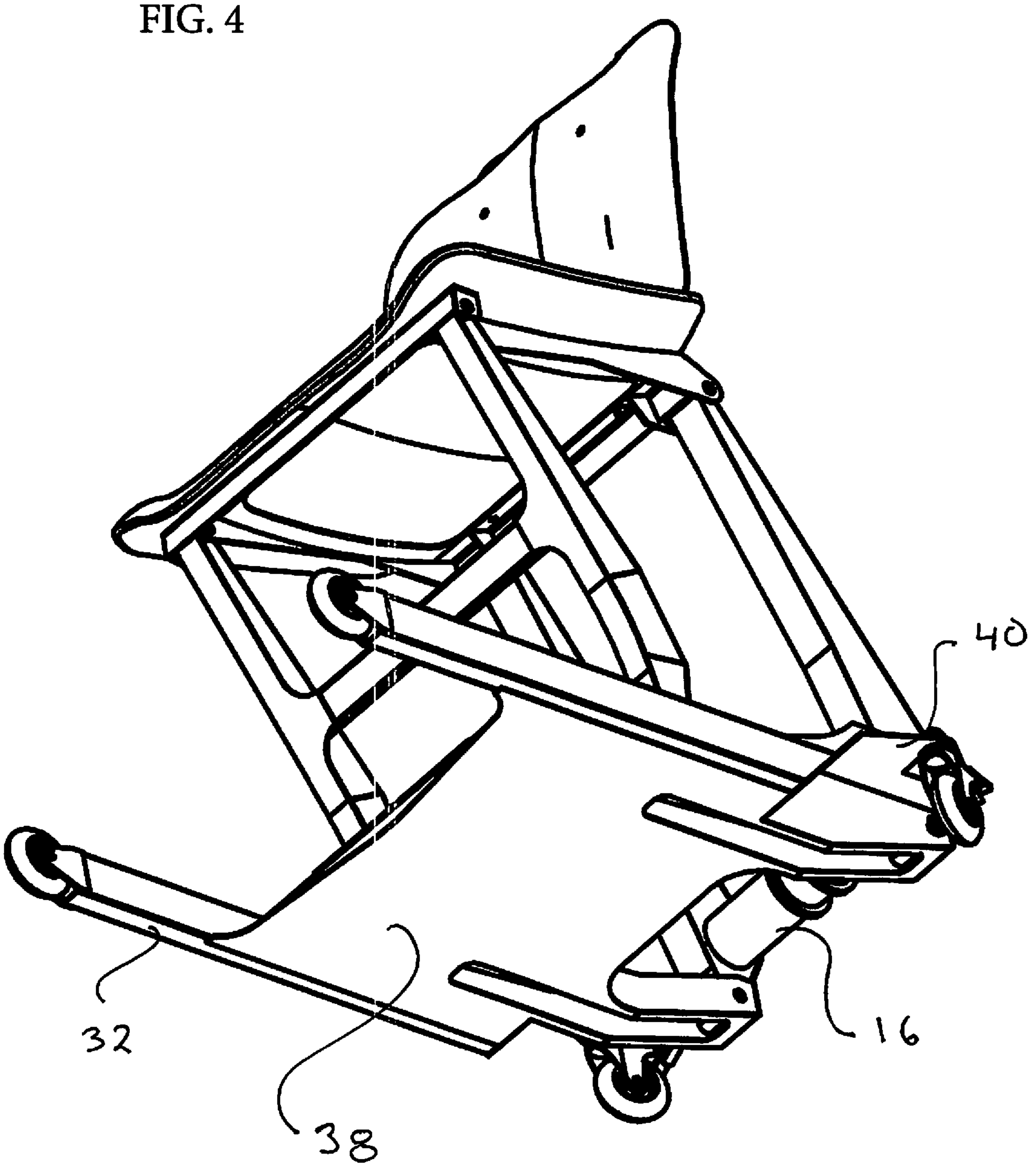
FIG. 4 is a bottom perspective view of the emergency lift apparatus in its raised configuration.
Figure 5:
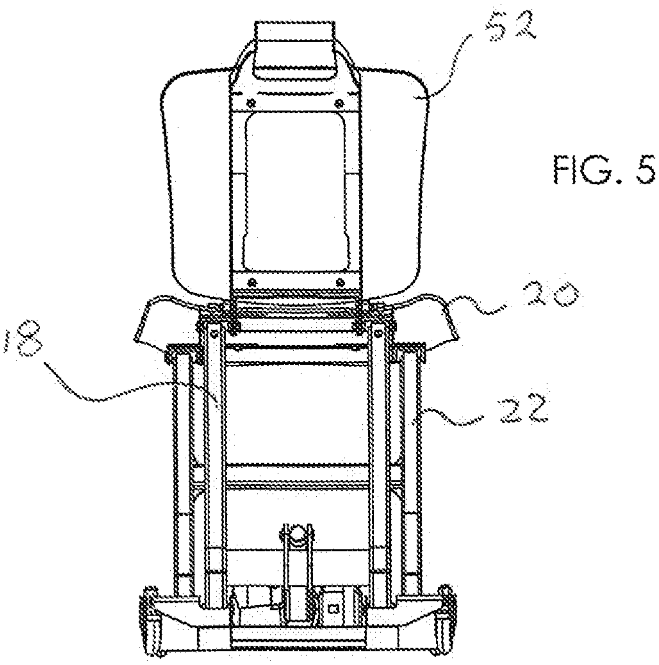
FIG. 5 is a rear view of the emergency lift apparatus in its raised configuration.
Figure 6:
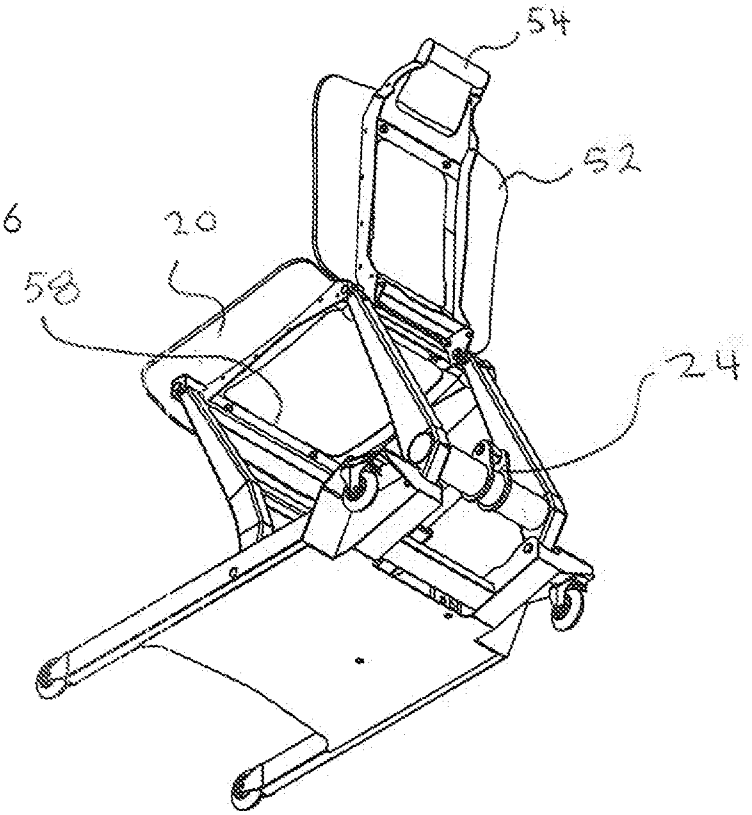
FIG. 6 is a bottom perspective view of the emergency lift apparatus in its raised configuration.
Figure 7:
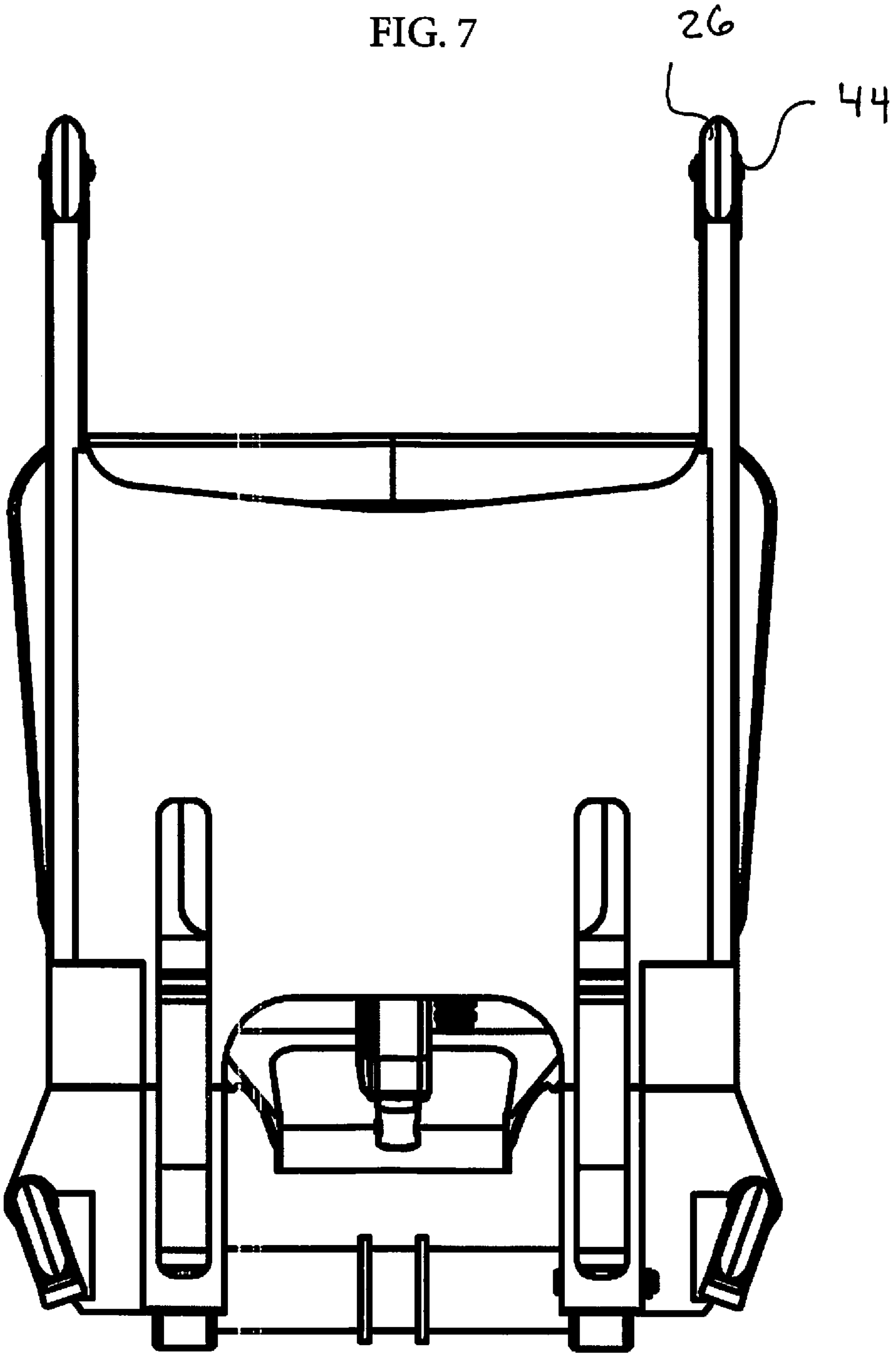
FIG. 7 is a bottom view of the emergency lift apparatus in its raised configuration.
Figure 8:
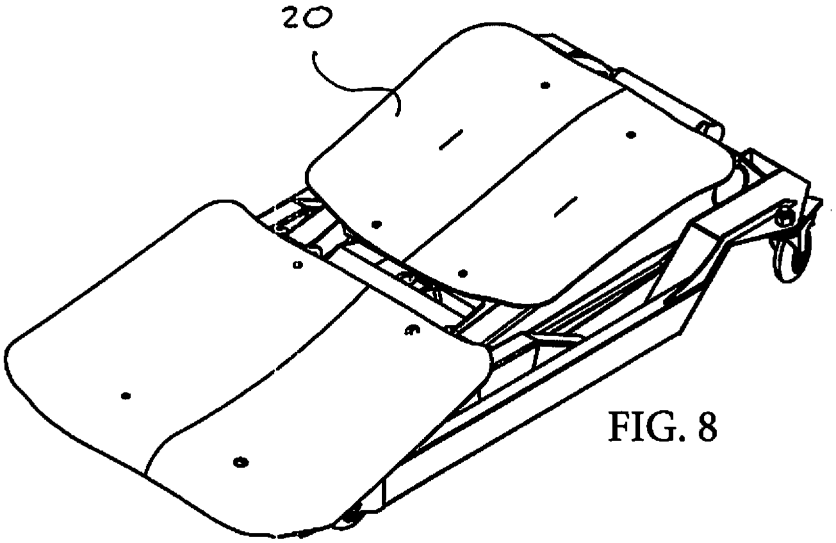
FIG. 8 is a side perspective view of the emergency lift apparatus in its collapsed configuration.
Figure 9:
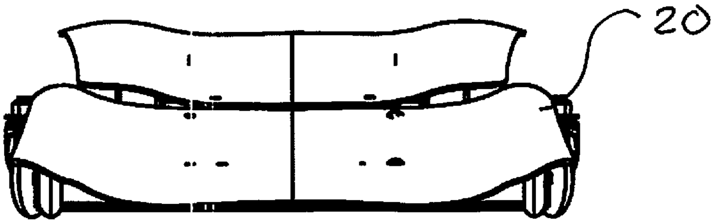
FIG. 9 is a front view of the emergency lift apparatus in its collapsed configuration.
Figure 10:
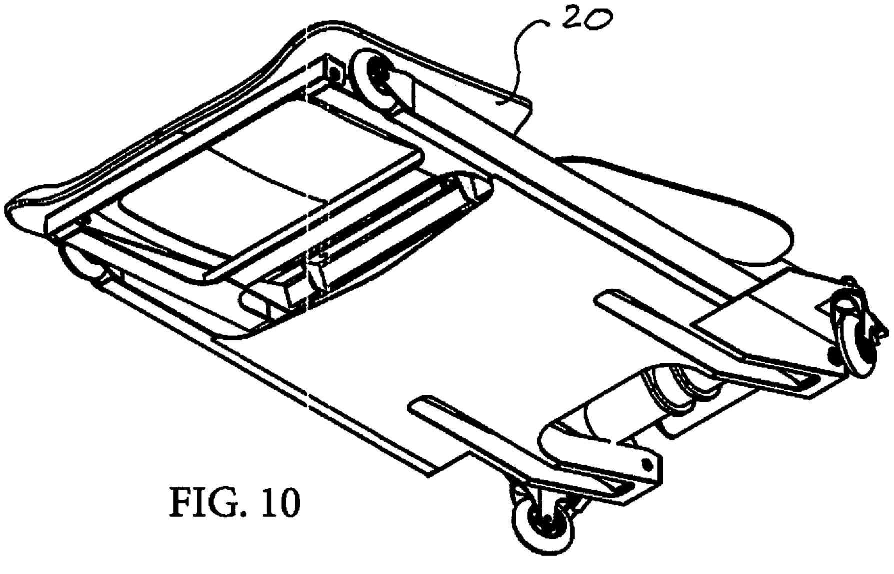
FIG. 10 is a bottom perspective view of the emergency lift apparatus in its collapsed configuration.

The lift 2 (FIG. 1) is an emergency necessitated portable apparatus that is lightweight and compact, measuring between three and four feet long, two feet wide and two feet high when vertically erect (FIG. 2). The lift 2 has a seat pickup height optimally at ground level or within one half inch from the ground. Its weight is less than 40 pounds. Its novel design allows a two piece folding polymer bucket style seat with a safety belt (not illustrated), to be slid under a person on the ground, and safely raised vertically to a height of approximately two feet. In the preferred embodiment there is a manual switch 6 located on the lift 2 although a remote switch (directly wired or wireless) may optionally be utilized. The vertical raising of the seat is accomplished by a battery powered, fail-safe linear actuator 8 with an extendible ram 10 selected from the set of linear actuators comprising screw jacks, direct motor drive actuators, belt drive actuators, hydraulic jacks and pneumatic jacks. Optionally, in other alternate embodiments, it may utilize a manually operated hydraulic ram as its lifting force. The preferred embodiment of the lift 2 is fabricated from a lightweight but strong material such as aluminum or carbon fiber.

Looking at FIGS. 1-4, the basic structural design and operation can best be explained. The lift 2 has a battery 14, operably connected to a reversing switch 6 and a linear actuator 8 pivotally mounted onto a rolling, stiffened frame. The linear actuator 8 has an extendible ram 10 that is operationally connected to brackets 24 on a torque axle 16, above the torque axle's axis of rotation. The torque axle 16 is rigidly affixed to the bottom end of a pair of rear legs 18 that are pivotally mounted at the distal end of the frame. There is a pair of front legs 22 pivotally mounted at the proximal end of the frame. A contoured seat pan 20 is pivotally mounted onto and above the pair of front legs 22 as well as mounted onto and above the pair of rear legs 18. When the ram 10 is extended, the torque axle 16 rotates causing the pair of rear legs 18 to vertically rise to approximately chair seating height (approximately 24 inches), vertically pulling up the seat pan 20 and the pair of front legs 22. The pairs of front and rear legs 22 and 18, never rise to form 90 degrees with the frame, but rather only form an acute angle with the frame when the lift 2 is fully raised. The linear actuator is preferably an electric screw jack that will not allow for reverse movement when the power to it is shut off because of its high gear ratio and frictional forces.

Figure 15:
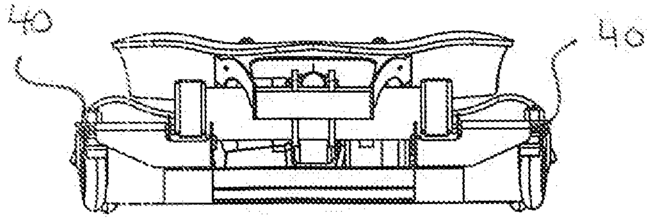
FIG. 15 is a rear view of the emergency lift apparatus in its collapsed configuration.
Figure 16:
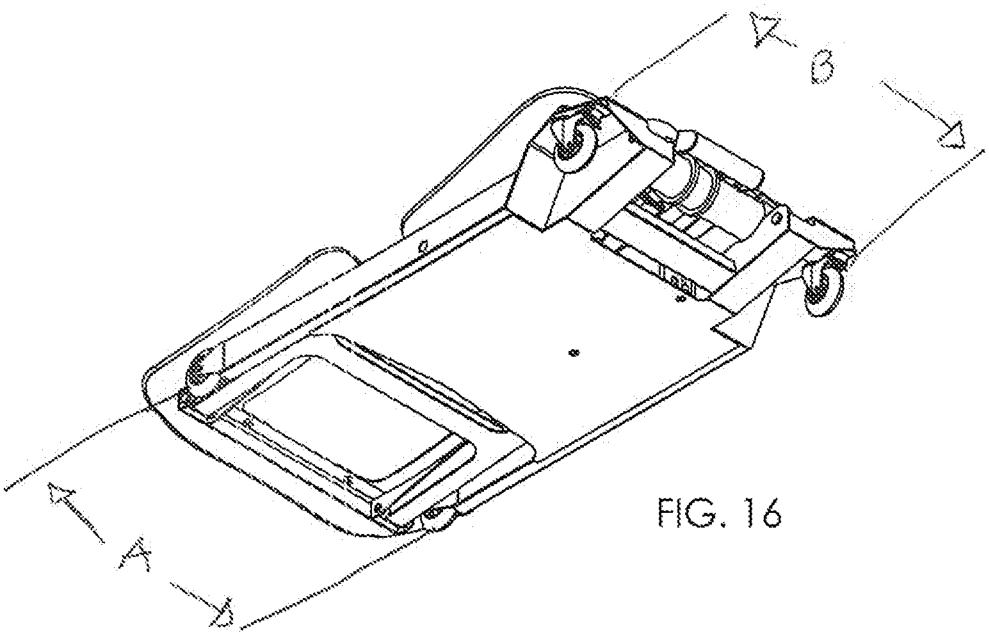
FIG. 16 is a bottom perspective view of the emergency lift apparatus in its collapsed configuration.
Figure 17:
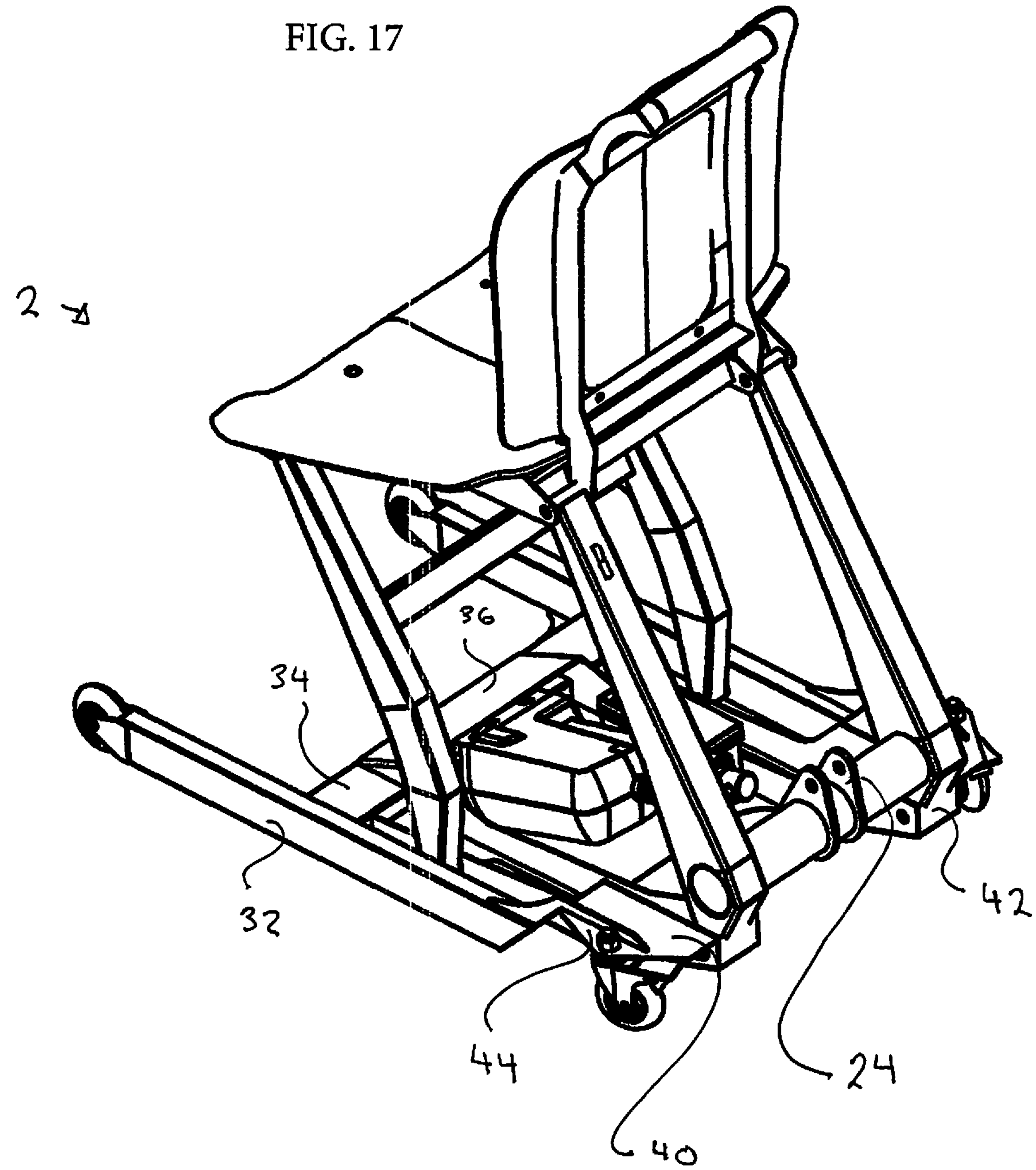
FIG. 17 is a rear perspective view of the emergency lift apparatus in its raised configuration.
Figure 18:
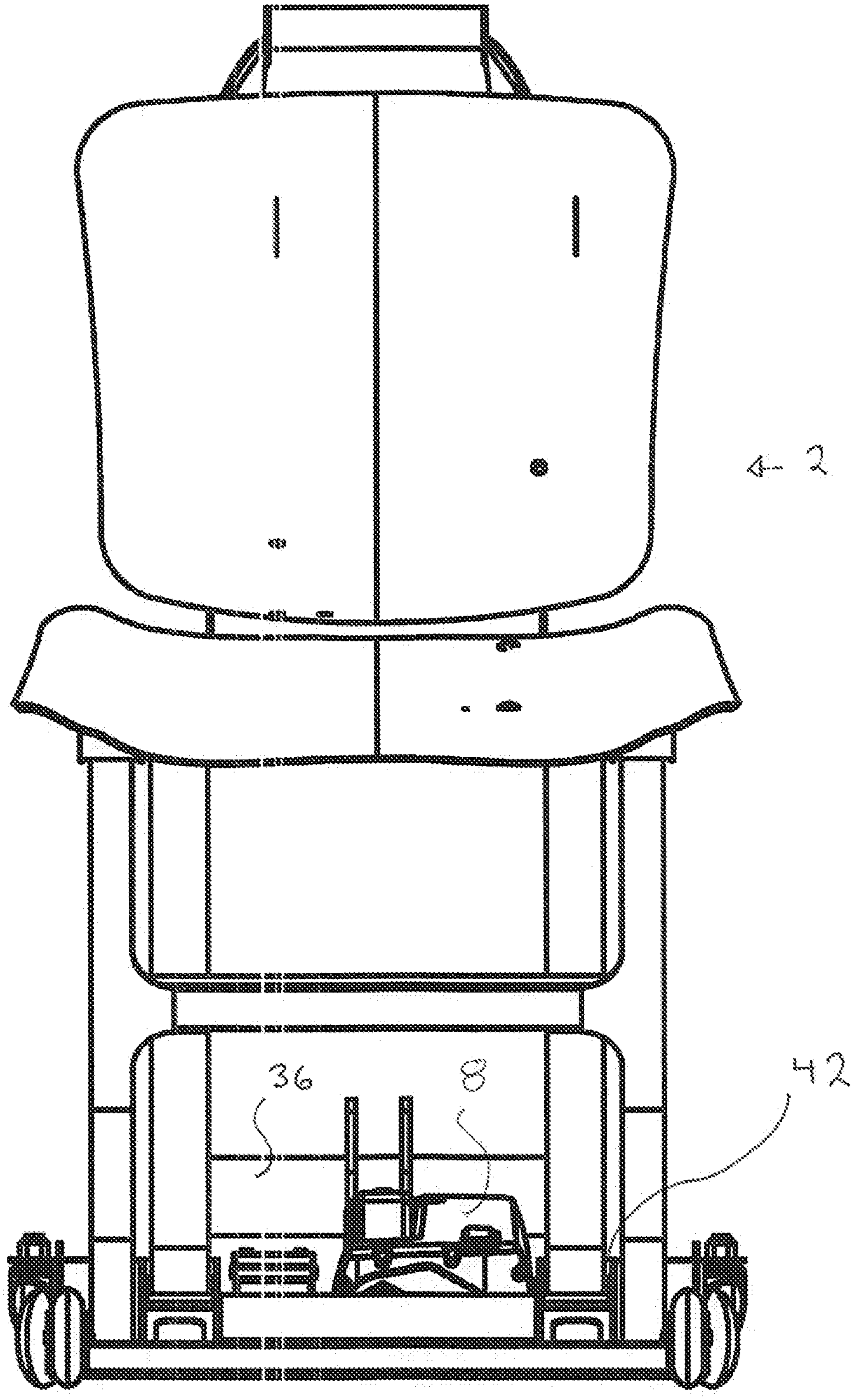
FIG. 18 is rear view of the emergency lift apparatus in its raised configuration.

Examining the lift 2 in more detail, with reference to FIGS. 1-7 and 17-18 it can be seen that the lift 2 has a rolling frame with a fixed pair of front wheels 26 and a pivotable pair of caster wheels 28. It is to be noted that the pair of rear wheels 28 are spaced wider apart than the pair of front wheels 26 are. Reference dimension lines A and B of FIG. 16. The frame is made of a pair of frame arms 32 held in a parallel spacing and prevented from twisting by a linear front cross member 34 affixed between the inner side faces of the frame arms 32, and a belly plate 38 affixed to the bottom and inner side faces of the front frame arms 32. The belly plate 38 extends beyond the distal ends of the frame arms 32 and is bent so as to form the rear leg/wheel mounting brackets 40. (See FIG. 15) These rear leg/wheel mounting brackets 40 have an inner U shaped mounting trough 42 and an outer caster wheel mounting plate 44. The linear front cross member 34 is strengthened (stiffened) by the attachment of an angled stiffener assembly 36 affixed to the top face of the front cross member 34. The rear leg/wheel mounting brackets 40 are held in their parallel spacing by the pivotable mounting of the rear legs 18 within the mounting trough 42 of the rear leg/wheel mounting brackets 40. The rear legs 18 are held in their spaced arrangement by the torque axle 16 which is welded or otherwise permanently affixed between the rear legs 18.

It is to be noted that much of the belly plate 38 and the stiffener assembly 36 has material removed where it is not structurally needed, so as to lighten the lift 2. This is important as the lift 2 will have to be manually transported from the emergency vehicle or location to the site of the downed person. The belly plate 38, linear front cross member 34 and the stiffener assembly 36 help maintain the parallelism and rigidity of the frame.

The lift 2 has a pair of arced front legs 22 and a pair of straight, tapered rear legs 18 the footprint of which forms a trapezoid since the rear legs 18 are located closer together that the front legs 22 so that as the lift collapses down, the rear legs 18 can reside inboard of the front legs 22. The front legs 22 are arced so as to allow them to extend over the front cross member 34. Each set of legs are pivotally connected to the frame at their bottom end and pivotally connected to the seat pan 20 at their top end. Between the top ends of each front leg 22 and rear leg 18 on the same side of the frame are pivotally attached two top lateral cross members 56 that are used to maintain the spacing between the legs, to stabilize the lift 2 and to attach the seat pan 20 to. Similarly, between each of the front legs 22 and between each of the rear legs 18 there are axial cross members 58 to maintain spacing, add rigidity and provide seat back pivotal mounting points.

Figure 11:
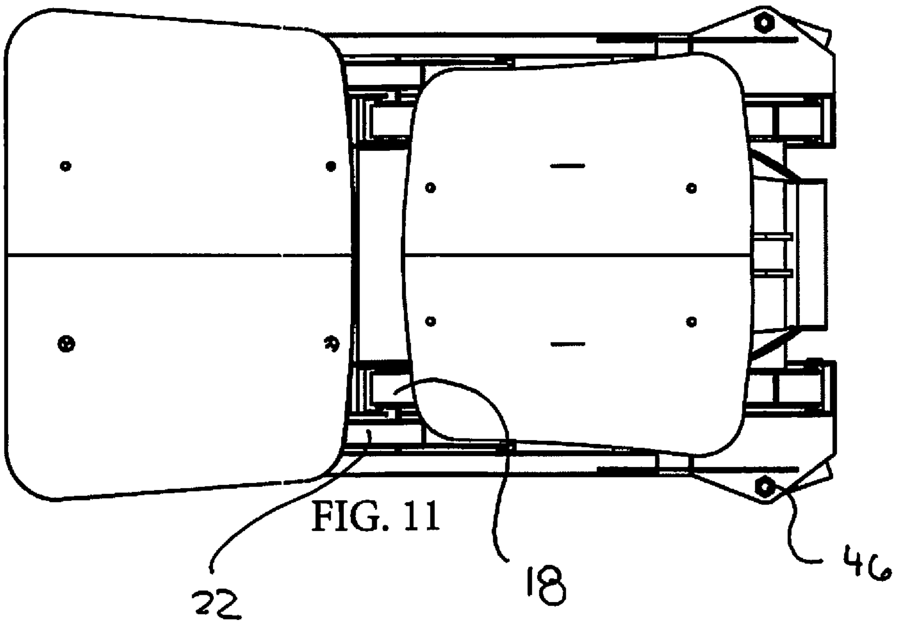
FIG. 11 is a top view of the emergency lift apparatus in its collapsed configuration.

The front wheels 26 are rotationally mounted with their axles 44 (FIG. 7) between the inner and outer sides of the proximal end of the frame arms 32. The rear wheels 28 are caster wheels and have their caster assembly's upper mounting bolt 46 (FIG. 11) affixed to the outer caster wheel mounting plate 44 portion of the rear leg/wheel mounting brackets 40.

Figure 12:
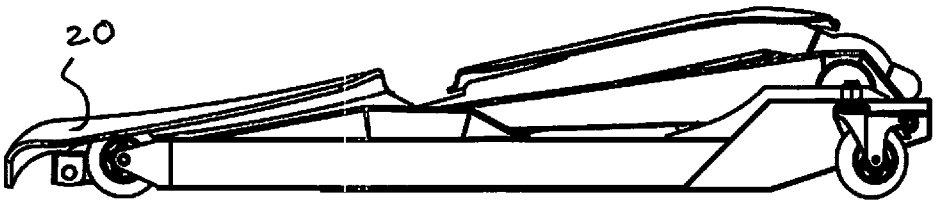
FIG. 12 is a side view of the emergency lift apparatus in its collapsed configuration.
Figure 14:
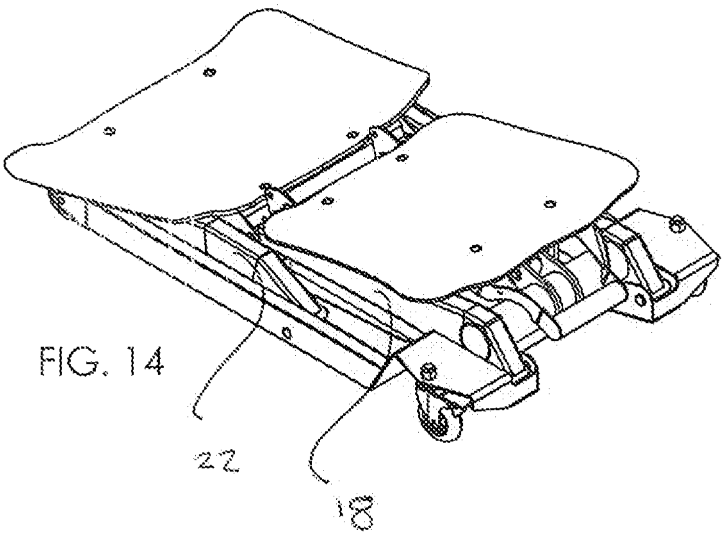
FIG. 14 is front perspective view of the emergency lift apparatus in its collapsed configuration.

It is important to note two structural features of the lift 2. First, the footprint of the front legs 22 and the rear legs 18 do not form a rectangle. Rather, since the rear legs 18 are closer together than the front legs 22, the footprint is that of a trapezoid. (See FIG. 5) In this way the rear legs 18 fold down adjacent and inboard of the sides of the front legs 22. This is necessary to allow the seat pan 20 to be able to touch the floor in the fully collapsed configuration of the lift. Second, the front legs are not linear but rather are arced so as to allow the front legs 18 to extend over the linear front cross member 34 when the lift 2 is in the fully collapsed configuration, and still have their top end touch the ground. (See FIGS. 11 and 14) It is the synergy of these two features that allow for both a compact, narrow collapsed lift, and for a lift that is able to lower the front of the seat pan 20 to the ground as seen best in FIG. 12.

Figure 13:
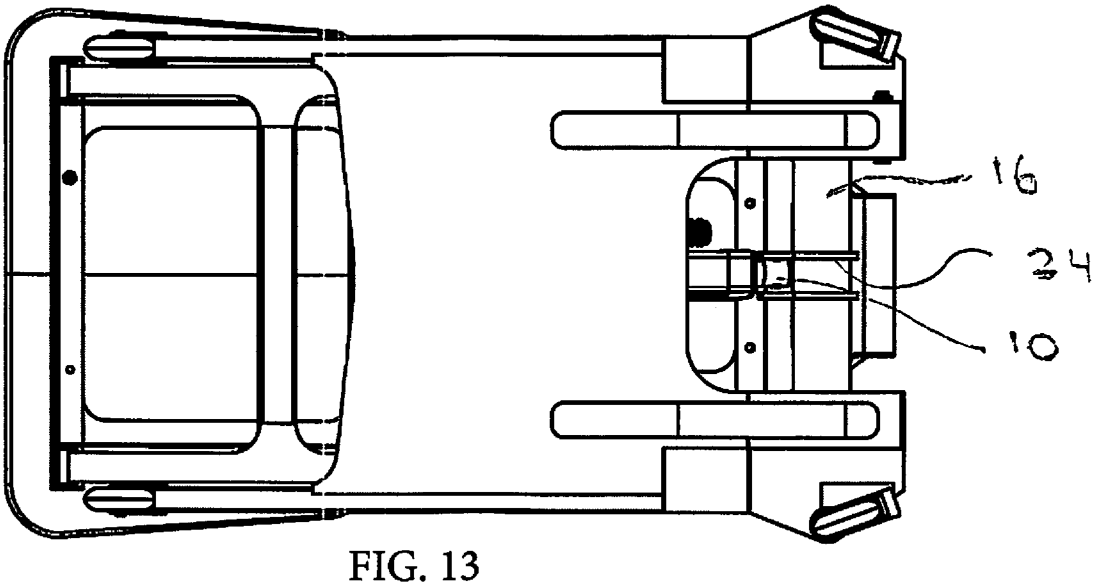
FIG. 13 is a bottom view of the emergency lift apparatus in its collapsed configuration.

The linear actuator 8, for visual clarity only shows its extendable ram 10 connected to the mounting brackets 24 on the torque axle 16 in FIG. 13. When connected it is via a pin that passes through alignable orifices in the end of the ram 10 and the sides of the two mounting brackets 24 on the torque axle 16. The linear actuator is sized to allow a 3 to 1 safety factor in lifting a 500 pound weight centered in the seat pan 20. The linear actuator cannot back drive in the event of a power loss because of steep gearing and frictional forces. The highest load on the linear actuator 8 occurs at ground level and thus if a failure is to occur, this is its most likely position, and the safest for the patient.

The linear actuator 8 must pivot on an upward angle as its ram 10 extends and rotates the torque axle 16 because the two brackets 24 that the ram 10 is connected to reside atop of the torque axle 16, and as they are pushed back with the extending ram 10 and rotating torque axle 16, they vertically rise, thus angling upward the linear actuator 8. To accommodate this tilting movement of the linear actuator 8, there is a linear actuator mounting bracket 50 mounted on the linear front cross member 34 that the linear actuator is pivotally mounted to. (See FIGS. 1 and 6) The linear actuator is a 3000 pound actuator that can raise 500 pounds with a three to one safety factor.

The seat is made up of a seat pan 20 and a seat back 52 with and integrated carrying handle 54. The seat pan is contoured side to side for the comfort of the patient and the front edge 56 of the seat pan 20 is curved downward. In this way, the front of the seat pan 20 actually touches the ground when loading a patient and there is no chance of creating a pinch point between the seat pan 20 and the ground/floor. The seat pan 20 and seat back 52 are mounted conventionally to the two top lateral cross members 56 and two axial cross members 58.

In operation, the lift chair 2 is transported in its collapsed configuration and placed on the floor/ground directly behind the downed person. The lift chair 2 is then rolled up to the person until the front lip of the seat pan 20 contacts or is in extremely close proximity to their downed body. The downed person slides their body onto the seat pan 20 of the lift 2. Once on and seated properly in a centered, upright position, the assisting personal uses the power switch 6 to slowly raise the seat. When the seat reaches its highest position (with the rams 10 fully extended), and with the front and rear legs 22 and 18 still at an acute angle with respect to the ground, the switch has a fail-safe feature that will sense the increase in current and its overload sensor will stop the power from the battery 10 to the electric linear actuator 8. Additionally, the linear actuator is designed with a "fail safe" position such that upon loss of electric power all motion of the ram 10 will be prevented and the seat cannot lower even under load. It is to be noted that the front and rear legs 22 and 18 never attain a truly vertical position that is 90 degrees from the frame. This is a safety feature to prevent backward tipping, allows a forward collapse in the event of a linear actuator failure.

As discussed above, one can realize that this lift 2 has a plethora of novel features that increase the safety and usability of it. The design of the lift 2 with the offset pair of legs 18 and 22 that have a footprint arranged in a trapezoid, allows for the rear legs 18 to reside parallel to and adjacent the front legs 22 when the lift 2 is in its collapsed configuration. This is also facilitated by the arc in the rear legs 18 that allows the rear legs 18 to extend over the linear front cross member 34 and still have the top end of the rear legs 18 extend to the floor with the seat pan 20.

While certain features and aspects have been described with respect to exemplary embodiments, one skilled in the art will recognize that numerous modifications are possible. In the preferred embodiment, the lift chair 2 is between three and four feet long L (FIG. 5), two feet wide Y (FIG. 5) and can rise to a vertical height of approximately two feet.

The invention claimed is:

1. An emergency lifting apparatus to raise a person from the ground to a seated height, comprising:
- a rolling frame having a proximal end and a distal end,
- a pair of front legs, each having a front bottom pivotally mounted on said rolling frame;
- a pair of rear legs, each having a rear bottom pivotally mounted on said rolling frame;
- a torque axle connected between a bottom of said pair of rear legs;
- a linear actuator having a front end connected to said rolling frame, and a rear end with an ram extendible therefrom and connected to said torque axle;
- a seat pan having a back and a front lip, said seat pan pivotally mounted to a top end of said front legs and pivotally mounted to a top end of said rear legs;
- a reversing power switch connected to said rolling frame;
- a battery, operably connected to said linear actuator through said reversing power switch.

2. The emergency lifting apparatus of claim 1 further comprising:
- a pair of a front wheels having first distance there between;
- a pair of rear wheels having a second distance there between;

wherein said first distance is less than said second distance.

3. The emergency lifting apparatus of claim 1 wherein said rear wheels are rotatable caster wheels and said front wheels are fixed axle wheels.

4. The emergency lifting apparatus of claim 1 further comprising a fully collapsed configuration and an extended configuration, wherein when in said collapsed configuration, said front lip of said seat contacts said ground.

5. The emergency lifting apparatus of claim 1 wherein said rolling frame further comprises;

a pair of front frame arms held in parallel spacing by a linear front cross member affixed between an inner side face of each front frame arm;

a belly plate affixed to a bottom and inner side face of each of said front frame arms, extending beyond a distal end of each of said front frame arms and bent to form a pair of rear leg/wheel mounting brackets;

wherein said rotatable castor wheels are rotationally mounted on said pair of rear leg/wheel mounting brackets; and wherein said front wheels are mounted at a proximal end of said front frame arms.

6. The emergency lifting apparatus of claim 5 further comprising:

a distance between said pair of front legs; and a distance between said pair of back legs;

wherein said distance between said pair of front legs is greater than said distance between said pair of back legs such that a footprint of said front bottom and said rear bottom forms a trapezoid.

7. The emergency lifting apparatus of claim 6 further comprising:

at least one torque axle mounting bracket extending from said torque axle;

wherein said front end of said linear actuator is pivotally connected to said rolling frame at said linear front cross member, and said ram is connected to said at least one torque axle mounting bracket; and wherein said linear actuator vertically pivots as said ram is extended to rotate said torque axle and raise said pair of rear legs.

8. The emergency lifting apparatus of claim 7 wherein said rear legs are linear members, and said front legs are arced members so said front legs can extend over said linear front cross member between said front frame arms of said rolling frame when the emergency lifting apparatus is in a fully collapsed configuration, and said top end of said front legs touch the ground.

9. The emergency lifting apparatus of claim 8 further comprising:

a fully collapsed configuration where said rear legs reside parallel, adjacent and inboard of the sides of said front legs, said front lip of said seat pan touches the ground.

10. The emergency lifting apparatus of claim 1 wherein said emergency lifting apparatus has a weight less than 30 pounds and a width of less than two feet.

* * * * *